(12) United States Patent
Pudewills et al.

(10) Patent No.: US 12,311,534 B2
(45) Date of Patent: May 27, 2025

(54) MANIPULATING DEVICE AND METHOD FOR OPERATION THEREOF

(71) Applicant: FESTO SE & CO. KG, Esslingen (DE)

(72) Inventors: Leif Pudewills, Esslingen (DE); Markus Singer, Plochingen (DE); Tobias Waibel, Ostfildern (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/559,705

(22) PCT Filed: May 4, 2022

(86) PCT No.: PCT/EP2022/061969
§ 371 (c)(1),
(2) Date: Nov. 8, 2023

(87) PCT Pub. No.: WO2022/238197
PCT Pub. Date: Nov. 17, 2022

(65) Prior Publication Data
US 2024/0227206 A1 Jul. 11, 2024

(30) Foreign Application Priority Data
May 11, 2021 (DE) ..................... 10 2021 204 777.7

(51) Int. Cl.
 *B25J 15/02* (2006.01)
 *B65G 59/02* (2006.01)
 *B65G 61/00* (2006.01)

(52) U.S. Cl.
 CPC .......... *B25J 15/0213* (2013.01); *B65G 59/02* (2013.01); *B65G 61/00* (2013.01)

(58) Field of Classification Search
 CPC ... B65H 3/02; B65H 3/22; B65H 3/00; B65H 3/46; B65H 2405/581; B65H 2404/2693;
 (Continued)

(56) References Cited

U.S. PATENT DOCUMENTS

| | | | | |
|---|---|---|---|---|
| 3,776,584 A | * | 12/1973 | Van Gerven | H01K 3/32 81/53.12 |
| 4,482,144 A | * | 11/1984 | Glassby | B65H 3/22 414/797.3 |

(Continued)

FOREIGN PATENT DOCUMENTS

| | | |
|---|---|---|
| DE | 27 49 908 | 5/1979 |
| DE | 10 2018 216 393 | 3/2020 |

(Continued)

OTHER PUBLICATIONS

Office Action issued in corresponding German Patent Application No. 10 2021 204 777.7, Jan. 13, 2022, 9 pages.

(Continued)

*Primary Examiner* — Gregory W Adams
(74) *Attorney, Agent, or Firm* — HSML P.C.

(57) ABSTRACT

A manipulating device, by which flexible flat objects can be repositioned and which has a movable gripping device which includes a support structure and at least one gripping unit. The gripping unit has a clamping arm which, together with a clamping surface of the support structure, delimits a clamping gap, in which a flat object portion can be firmly clamped. By means of a transport structure of the clamping arm which is drivable for a circumferential transport movement, the flat object portion can be transported into the clamping gap for subsequent clamping.

24 Claims, 7 Drawing Sheets

(58) Field of Classification Search
CPC .......... B65H 2701/174; B65H 2405/57; B65H 2405/571; B65G 47/1478; B65G 47/90; B65G 61/00; B65G 59/02; D06F 5/06; B25B 7/02; B25J 15/0213; B25J 15/08; B25J 15/0028
USPC ................ 242/419.9, 532.2; 271/19, 33, 93; 294/106, 8.5, 1.2
See application file for complete search history.

(56) References Cited

U.S. PATENT DOCUMENTS

| | | | |
|---|---|---|---|
| 5,303,910 | A | 4/1994 | McGill et al. |
| 6,935,238 | B2 * | 8/2005 | Kawamura ........ G03G 15/6564 |
| | | | 101/477 |
| 8,967,688 | B2 * | 3/2015 | Wilson ................ E01H 1/1206 |
| | | | 294/1.3 |
| 9,527,135 | B2 * | 12/2016 | Kenner ................ B23B 13/123 |
| 10,464,217 | B1 * | 11/2019 | Phan ........................ B25J 15/10 |
| 2002/0113448 | A1 | 8/2002 | Kazerooni et al. |
| 2002/0125727 | A1 | 9/2002 | Kazerooni et al. |
| 2008/0179002 | A1 * | 7/2008 | Gromadzki .............. B65H 3/40 |
| | | | 156/701 |
| 2009/0302523 | A1 * | 12/2009 | Wattyn ..................... B65H 5/08 |
| | | | 271/12 |
| 2021/0078184 | A1 * | 3/2021 | Andresen ................ B25J 15/00 |
| 2022/0032474 | A1 | 2/2022 | Pudewills et al. |

FOREIGN PATENT DOCUMENTS

| | | | |
|---|---|---|---|
| JP | 1-231732 | 9/1989 | |
| JP | 2-198927 | 8/1990 | |
| WO | WO-2019137585 A1 * | 7/2019 | .............. B25J 15/00 |

OTHER PUBLICATIONS

International Search Report and Written Opinion issued in International Application No. PCT/EP2022/061969, Sep. 19, 2022, 17 pages w/partial translation.

* cited by examiner

MANIPULATING DEVICE AND METHOD
FOR OPERATION THEREOF

The invention relates to a manipulating device for repositioning flexible flat objects, with at least one gripping device which is movable in space and has a central notional vertical axis, which gripping device has at least one gripping unit permitting releasable gripping and holding of flat objects. The invention also relates to a method for operating such a manipulating device.

A manipulating device of this type, known from DE 10 2018 216 393 A1, contains at least one gripping device which is movable in space by means of a positioning unit formed for example by a robot and has one or more gripping units making possible releasable gripping and holding of flat objects. Each gripping unit is equipped with an adhesive tape which can be applied by corresponding positioning of the gripping device on a flat object, with the result that same sticks to the gripping unit. In such gripped state, the flat object can be repositioned by means of the gripping device, and laid down again at a different location. Flexible flat objects can even then actually be manipulated reliably with the known manipulating device if the objects are air permeable. During deployments in dusty surroundings, or when manipulating textile objects which tend to pill, the adhesive tape can, however, quickly become soiled, a consequence of which can be a decrease in holding forces.

SUMMARY OF THE INVENTION

The object of the invention is to produce a manipulating device with which flexible, air permeable flat objects can still be gripped even after longer service life, and laid down again simply after repositioning. Furthermore, an effective method for operating such a manipulating device is intended to be proposed.

To achieve this object, in a manipulating device in connection with the features named at the outset, it is provided that the gripping device has a support structure which is provided with a bearing surface pointing downwards in the axial direction of the vertical axis on an underside of the gripping device, with which support structure the gripping device can be placed on a flat object to be gripped, to adopt a gripping position, and that the at least one gripping unit has a clamping gap extending between a clamping surface of the support structure and a clamping arm arranged on the support structure, which gap is open with an object introduction opening towards the underside of the gripping device, and in which a flat object portion of the flat object to be repositioned can be firmly clamped, releasably,
wherein the clamping arm has a transport structure which can be pressed on the flat object to be gripped in the gripping position of the gripping device, and can be driven by a rotary drive device to a circular transport movement, by means of which a flat object portion impinged on by same can be transported, frictionally, through the object introduction opening, into the clamping gap.

The object is also achieved by means of a method which provides for the aforementioned manipulating device to be operated by carrying out the following method steps:
(a) positioning the gripping device in a gripping position in which the support structure is placed with its bearing surface from vertically above on a flexible flat object to be repositioned,
(b) pressing the transport structure of each gripping unit on the flat object to be gripped while or after positioning the gripping device in the gripping position,
(c) carrying out the circular transport movement of the transport structure, and thereby transporting, frictionally, a flat object portion impinged on by the transport structure into the clamping gap, wherein the transport movement is started before or after pressing the transport structure onto the flat object,
(d) holding the flat object portion moved into the clamping gap by clamping between the clamping arm and the clamping surface of the support structure, and
(e) shifting the gripping device, including the held flat object, to a target location.

The measures according to the invention offer the advantageous possibility of gripping flexible—often also called pliable—flat objects, such as for example textiles or films, securely, and clamping them temporarily for the purposes of displacement, even if the flat objects have an air permeable structure. This concept of "holding" is based on clamping of the flat object, wherein, however, only one specific flat object portion of the flat object to be repositioned is clamped per gripping unit of the gripping device, rather than the whole flat object. The gripping device has one or more gripping units, each of which defines a clamping gap in which a releasable clamping of the flat object portion to be held can be carried out. The clamping gap is defined between a clamping surface designed on a support structure of the gripping device and a clamping arm arranged on the support structure. A change in position of the gripping device leads to a corresponding change in position of each gripping unit, with the result that the clamped flat object is entrained for repositioning. To grip the flat object portion, the gripping device with a bearing surface designed on the support structure can be placed in advance on the flat object to be gripped with an in particular extensive contact, such that the flat object portion for the bearing surface to be held is not covered, but extends adjacent to the bearing surface in the region of a gap opening in the clamping gap, called object introduction opening. This flat object portion can be introduced into the clamping gap by means of the clamping arm, for which purpose the clamping arm has a transport structure which can be driven to a circular transport movement by means of a rotary drive device designed preferably as a component of the gripping device. When the gripping device is brought into the gripping position, or already while being brought into the gripping position, the transport structure can be pressed onto the flat object portion projecting over the bearing surface, with the result that, on the basis of the friction between the transport structure and the flat object, the transport movement of the transport structure leads to the flexible flat object portion being transported or rolled into the clamping gap through the object introduction opening. Depending on the design of the clamping mechanism present, the clamping of the flat object portion in the clamping gap can be combined directly with the function of the rolling into the clamping gap or can take place chronologically thereafter. In order to lay down a clamped flat object at the target location after repositioning, it is mostly sufficient to cancel the clamping of the flat object portion located in the clamping, with the result that the flat object can fall away from the gripping device, due to its weight. When the clamping arm is designed accordingly, the flat object portion can however also be pushed out of the clamping gap actively by a reversed transport movement of the transport structure. Such pliable flat objects, the surface area of which is substantially greater than that of the gripping device, can themselves be held securely by the manipulating device, wherein the clamped flat object portion is folded over not in one layer, but in two layers.

Advantageous developments of the invention can be seen in the dependent claims.

The transport structure is made expediently of a material with rubbery-elastic properties, which material has a high friction coefficient. Preferably, the transport structure is made of an elastomer material and in particular silicone rubber. In this way, the material of the flat object can remain stuck, releasably, to the transport structure and can be transported into the clamping gap reliably.

The bearing surface of the support structure provided for laying on a flat object to be received extends expediently in a bearing plane at right angles to the vertical axis of the gripping device. Preferably, the bearing surface is designed flat, overall.

The clamping gap of the gripping unit extends in a plane, called gap plane, which is expediently inclined in respect of the vertical axis of the gripping device such that its distance, and consequently the distance between the clamping gap and the vertical axis, increases in direction of the underside of the gripping device. Preferably, the bearing plane and the gap plane enclose an acute angle which is preferably in the order of 45 degrees.

The clamping of the flat object portion in the clamping gap can for example be based on the resilience of the flat object material and/or the transport structure, without an active clamping movement having taken place. For example, a clamping mechanism which has a clamping stamp which moves in respect of the support arm or support structure, is possible. However, an embodiment in which the releasable clamping of the flat object portion by means of a clamping arm which can be moved overall in respect of the support structure, is considered particularly advantageous. In this case, it is expediently provided that the clamping arm of the at least one gripping unit is arranged to be movable, in swivelling manner, on the support structure and, in respect of the support structure, can carry out a clamping arm swivel movement, called swivel movement, in which a gap height of the clamping gap, measured between the clamping surface and clamping arm, is changed. Preferably, the clamping gap has a contour which tapers from the object introduction opening towards the opposite inner end of the gap, at least when a flat object portion is not in clamped state, which contour has an acute gap angle which is changed during the clamping arm swivel movement.

The transport structure has a portion, associated in particular with the free end of the clamping arm, which portion can be or is pressed into the gripping position of the gripping device on the flat object portion to be gripped. This portion of the support structure is called transport initialisation portion, as it is responsible for initially entraining the flat object portion during the circular transport movement. When the clamping arm swivel movement of the clamping arm in respect of the support structure is taking place, the height position of the transporting initialisation portion, adopted in respect of the support structure and thus also in respect of the bearing surface, is changed. This offers the possibility of imposing a contact pressure which guarantees a secure entrainment of the flat object portion.

To induce the clamping arm swivel movement and to position the clamping arm in different swivel positions in respect of the support structure, the gripping device is expediently equipped with a swivel drive device. The swivel drive device preferably has a linear drive unit arranged on the support structure, which unit engages with the clamping arm in force-transmitting manner via a toothed gear transmission. The linear drive unit is preferably motor-driven, and contains in particular an electric motor which is preferably a servomotor. For simple applications, the linear drive unit can also be of a manual construction, and for example have a manually operated handle which can be combined with a handle allowing manual transport of the gripping device.

Whether motor-driven or manual, in any case it is expedient when the linear drive unit has a servo which can be driven to a linear drive movement in the axial direction of the vertical axis, which servo has a gearbox of the toothed gear in the manner of a toothed rack, which gearbox is in toothed engagement with a curved output spline of the toothed gear arranged on the clamping arm of the gripping unit, with the result that a clamping arm swivel movement of the clamping arm clockwise or counter-clockwise can be induced, depending on the linear movement direction of the servo.

As already discussed, it is expedient, in a clamping arm suitable for carrying out a swivel movement, to induce the processes of clamping and re-releasing the flat object portion located in the clamping gap by the clamping arm clamping arm swivel movement and the resulting change in gap height of the clamping gap. The gap height of the clamping gap is determined by the distance between the clamping surface of the support portion and the opposite transport structure of the clamping arm.

Preferably, the clamping arm can be swivelled so far downwards, by means of the clamping arm swivel movement, that the transport initialisation portion of the transport structure is lower in the axial direction of the vertical axis than the bearing surface of the support structure. This makes possible, particularly simply, the successive gripping and then simultaneous holding of a plurality of flat objects in one and the same clamping gap. In this way, a plurality of flexible flat objects, provided stacked on top of one another as a flat object stack, can be jointly repositioned.

In this connection, an advantageous procedure provides that method step (a), mentioned further above, is carried out only in respect of the topmost flat object of the flat object stack, and then when maintaining the gripping position abutting against the topmost flat object, by carrying out method steps (b) and (c), likewise mentioned further above, once or repeatedly, a flat object portion of one or more flat objects lying beneath is likewise transported into the clamping gap, with the result that flat object portions of a plurality of flat objects are arranged lying one on top of another in the clamping gap. As the stack height of the flat object stack below the bearing surface of the support structure does not change with these processes, but this is the case in the stack portion associated with the introduction gap on the basis of the flat object portions rolled into the clamping gap, the contact pressure required for reliably entraining a flat object portion can be maintained by swivelling the clamping arm downwards. When the flat object portions of all flat objects to be gripped are arranged one on top of another in the clamping gap, according to the aforementioned method steps (d) and (e), all flat object portions in the clamping gap can be jointly clamped and shifted by displacing the gripping device to a target location.

Expediently, the transport structure is part of a transport device of the clamping arm which is arranged in respect of same on an arm base of the clamping arm connected to the support structure. The arm base and the transport structure can carry out the clamping arm swivel movement jointly when the clamping arm is swivelable, wherein, however, the transport structure is capable of carrying out the circular transport movement relative to the arm base.

It is favourable if the transport device has a transport roller arrangement which has at least one rotatable transport roller and about which the transport structure extends annularly, in self-contained manner. At least one, and optionally the only, transport roller of the transport roller arrangement can be rotationally driven to create the circular transport movement of the transport structure. Only that portion of the transport structure which is arranged in the region of the clamping gap is always active on the part of the transport structure.

The clamping gap has a gap longitudinal axis extending between the object introduction opening and the gap end opposite same, which axis is in a common plane together with the vertical axis. The transport roller arrangement contains, expediently, a plurality of transport rollers arranged at a distance from one another and rotatable at the arm base, around which the transport structure is wound and one of which can be rotationally driven by means of the rotary drive device in order to create the circular transport movement of the transport structure. Two of the available transport rollers form guide rollers arranged on the end of the transport roller arrangement, wherein these can be the individual transport rollers. In particular, when the transport rollers designed as guide rollers have a slightly greater distance between them, it is advantageous if at least one further transport roller is arranged therebetween, which roller is designed only to support, and not to guide, the backup roller serving to guide the transport structure.

In a very simple embodiment of the manipulating device, the transport roller arrangement contains only one single transport roller which is surrounded on all sides by the transport structure participating in the rotational movement of the individual transport roller, and thereby carrying out the circular transport movement.

The longitudinal portion of the transport structure which currently guides the transport roller associated with the object introduction opening expediently forms a transport initialising portion of the transport structure which can be pressed onto the flat object to be gripped, as already explained in detail above.

The rotary drive device present to create the transport movement of the transport structure, which device expediently is a component of the gripping device, expediently has a rotary drive unit which is coupled to the transport structure of the at least one gripping unit via a gearing mechanism designed in particular as a change gear drive. An optimal gear transmission ratio and consequently a preferred rotational speed of the transport structure can be generated via the design of the gearing mechanism. The gearing mechanism can alternatively also be designed as a belt drive. When the gripping device has a plurality of gripping units, the rotary drive unit is expediently responsible for driving the transport structures of both clamping arms.

Above all in connection with automated operation, it is advantageous when the rotary drive unit is designed as an engine, and for example contains an electric motor and in particular a servomotor. For simple applications, the rotary drive unit can also be designed to be manual, and for example can have a hand crank for introducing torque.

The transport structure expediently consists of at least one annularly self-contained flexurally flexible line element. The line element can for example be designed band-shaped or restiform. The transport structure can consist of just a single line element, for example a sufficiently wide conveyor belt, or can be composed of a plurality of line elements mutually spaced out next to one another, which elements are designed for example in the form of narrow strips or in the form of annular bodies, with a round, and in particular circular, material cross-section.

When shifting the gripping device, in order that a gripped flat object does not hang underneath the gripping device in uncontrolled manner, it is advantageous if the gripping device has not only one single gripping unit—which in principle is also possible—but is equipped with a plurality of gripping units. Preferably, the gripping device has precisely two gripping units arranged adjacent to one another, transverse to the vertical axis of the gripping device, which units are designed to be a mirror image in respect of this vertical axis and both of which can be used to grip and hold one and the same flat object on different flat object portions.

Preferably, the plurality of gripping units can be operated synchronously. In this case it is expedient if a linear drive unit is provided to generate the clamping arm swivel movements of all clamping arms and a rotary drive unit is provided for the transport movements of all transport structures.

Expediently an attachment interface is designed on the support structure of the gripping device, via which interface the gripping device can be fixed to a positioning unit preferably also forming part of the manipulating device, which interface is for example a robot or any other type of manipulator and which permits a machine spatial moving of the gripping device.

The manipulating device can be equipped with just a single gripping device or with a plurality of gripping devices. A plurality of gripping devices are arranged preferably transverse to its vertical axis, distributed a mutual distance apart. A plurality of gripping devices can be attached consistently to one and the same positioning unit. A plurality of gripping devices is recommended in particular for manipulating very large-scale flexible flat objects, for example textile webs or film webs. Here, the large-scale flat object can be held at several points simultaneously by means of the plurality of gripping devices, for subsequent transport. The manipulating device expediently has a basic frame to which the plurality of gripping devices is attached at a mutually changeable distance, with the result of the possibility of adaptation to the surface area of the flat object to be manipulated. The basic frame can have an attachment interface for attaching to a positioning unit.

The manipulating device is expediently equipped with an electronic control device with which operation of the at least one gripping device and its components can be controlled, and in particular also automated.

BRIEF DESCRIPTION OF THE DRAWINGS

The invention is explained in more detail below using the attached drawings. There are shown in.

DETAILED DESCRIPTION OF THE INVENTION

Figure 1:
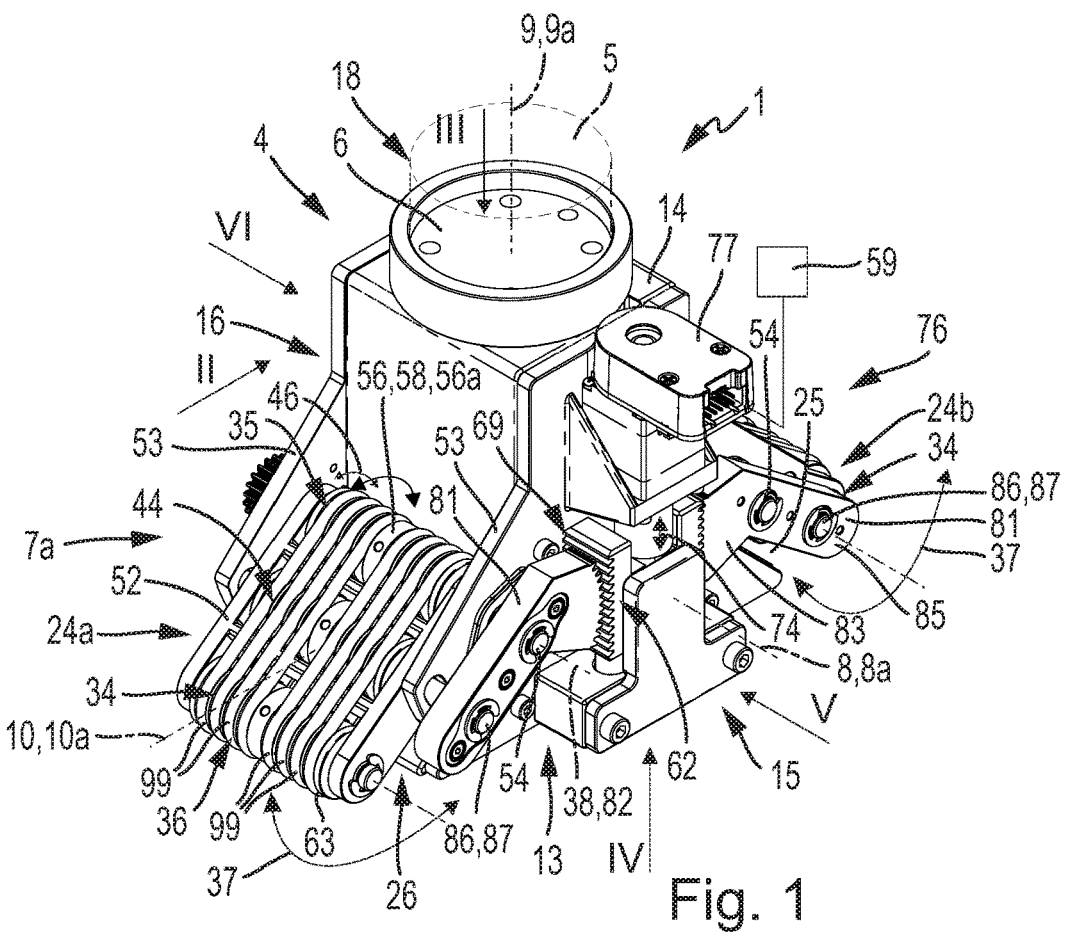
FIG. 1 a preferred embodiment of the manipulating device according to the invention in a perspective view, wherein a preferred structural shape of a gripping device is illustrated in a state attached to a positioning unit indicated only by dotted lines, FIG. 2 the gripping device from FIG. 1 in a lateral view with viewing direction according to arrow II from FIG. 1, FIG. 3 a top view of the gripping device with viewing direction according to arrow III from FIG. 1, FIG. 4 a bottom view of the gripping device with viewing direction according to arrow IV from FIG. 1, FIG. 5 a front view of the gripping device with viewing direction according to arrow V from FIGS. 1 and 2, FIG. 6 a rear view of the gripping device with viewing direction according to arrow VI from FIGS. 1 and 2, FIG. 7 a section through the gripping device parallel to a vertical axis of the gripping device according to sectional plane VII-VII from FIGS. 2 and 9, FIG. 8 a further section through the gripping device in a sectional plane VIII-VIII at right angles to the vertical axis from FIG. 6, FIG. 9 a section through the gripping device in a sectional plane IX-IX parallel to the vertical axis from FIG. 6, running perpendicular in respect of the sectional plane of FIG. 7, and FIGS. 10 to 14 several operational phases of the gripping device when gripping one or more flat objects, in a sectional representation corresponding to FIG. 7.
Figure 2:
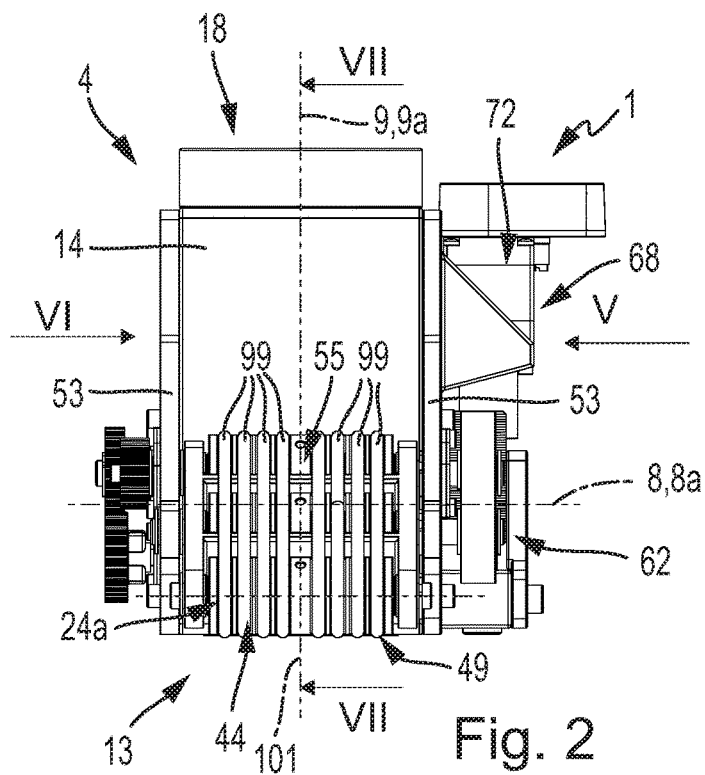

A manipulating device 1 is shown in the drawing, which device can be used to reposition one or more flat objects 2 between a starting location and a target location. The flat objects 2 have flexible, or in other words pliable, properties, which for example will be encountered in layers of textiles or plastic films or thin rubber mats. The flat objects 2 are objects with laminar extension, and a relatively low thickness transverse to their plane of expansion.

The respective flat object 2 to be repositioned is provided for repositioning at the starting location for example by a supply device 3 of any type. In the simplest case, the supply device 3 is a support, such as for example a table. The supply device 3 can be a component of a manufacturing machine through which the flat objects 2 can be supplied in a shape tailored to any desired contour.

As main component, the manipulating device 1 contains at least one gripping device 4, wherein the illustrated manipulating device 1 is equipped with precisely one such gripping device 4. More complex structural shapes of the manipulating device 1 contain a plurality of gripping devices 4 in any distribution necessary, wherein it is advantageous when all gripping devices 4 are placed distributed in one working plane. Such a manipulating device 1 is expediently equipped with adjusting means which make it possible to change the relative position between the plurality of gripping devices 4 and to fix same releasably in different patterns.

With their intended use, the gripping device 1 by way of example is fastened to a positioning unit 5 illustrated only schematically by a dotted line, expediently likewise forming a component of the manipulating device 1, but an external component can definitely also be made available. The gripping device 4 has an attachment interface 6, which for example is designed as a clamping flange suitable for screw fastening to the positioning unit 5.

The positioning unit 5 is for example a robot or a mobile robot arm. The positioning unit 5 is for example driven electrically and/or by means of fluid force. By correspondingly operating the positioning unit 5, the gripping device 4 can be moved in space as necessary by carrying out a manipulating movement. The manipulating movement is preferably a three-dimensional movement, although also any other degrees of freedom of movement can also be provided.

Figure 3:
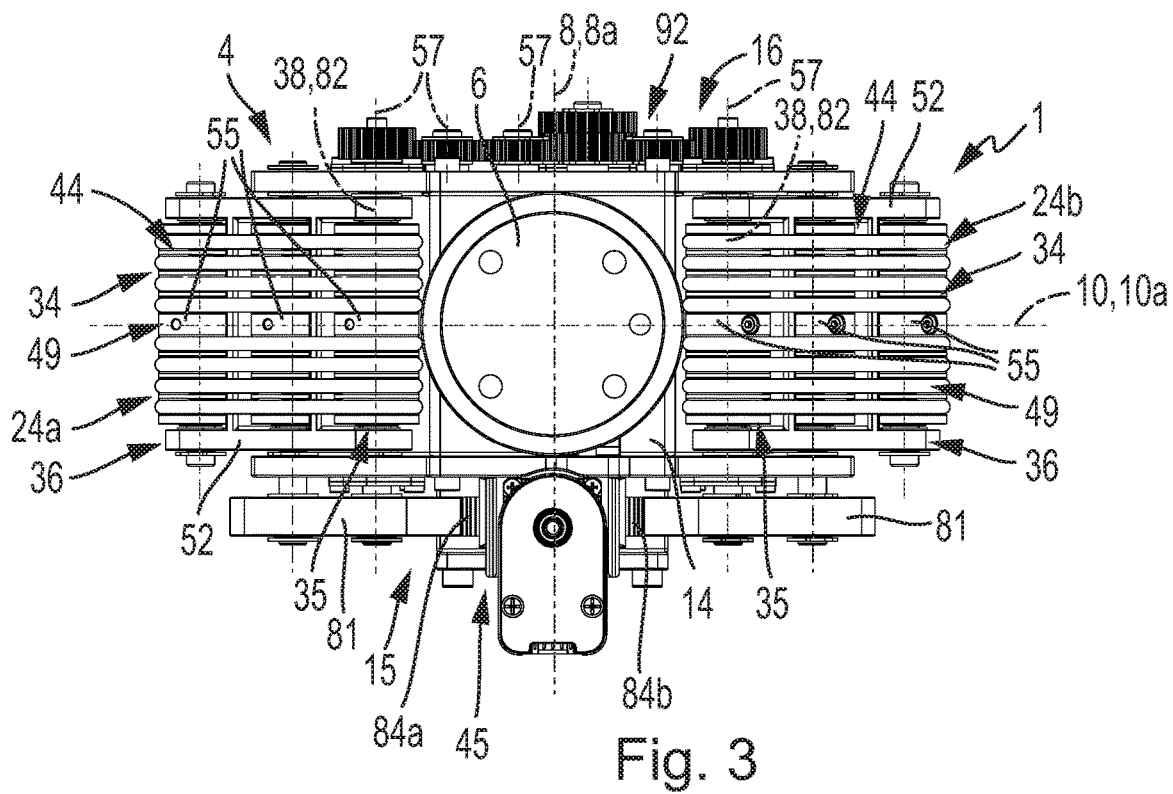
Figure 4:
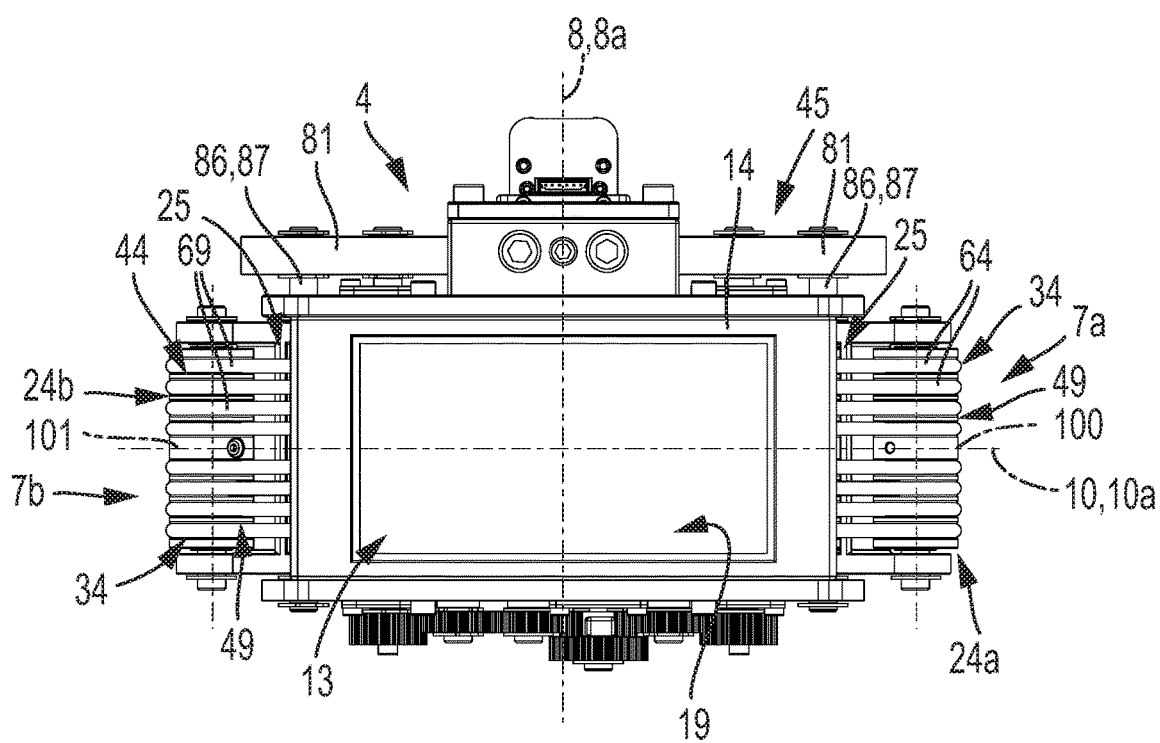

The gripping device 4 has a notional vertical axis 9, the axial direction 9a, also called height direction 9a below. The vertical axis 9 extends between a top side 18 and a bottom side 13 of the gripping device 4. FIG. 3 shows a view of the top side 18 and FIG. 4 a view of the bottom side 13. In not exclusive but normal operation, the vertical axis 9 is aligned vertically.

Figure 5:
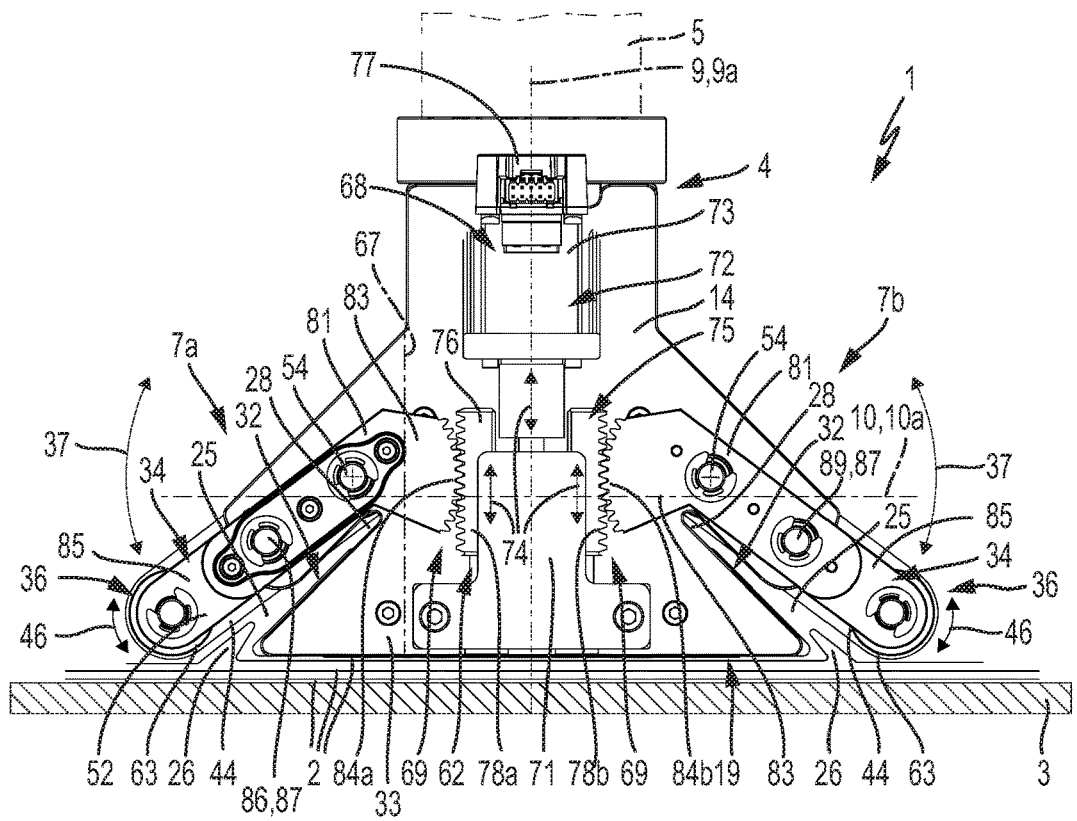
Figure 6:
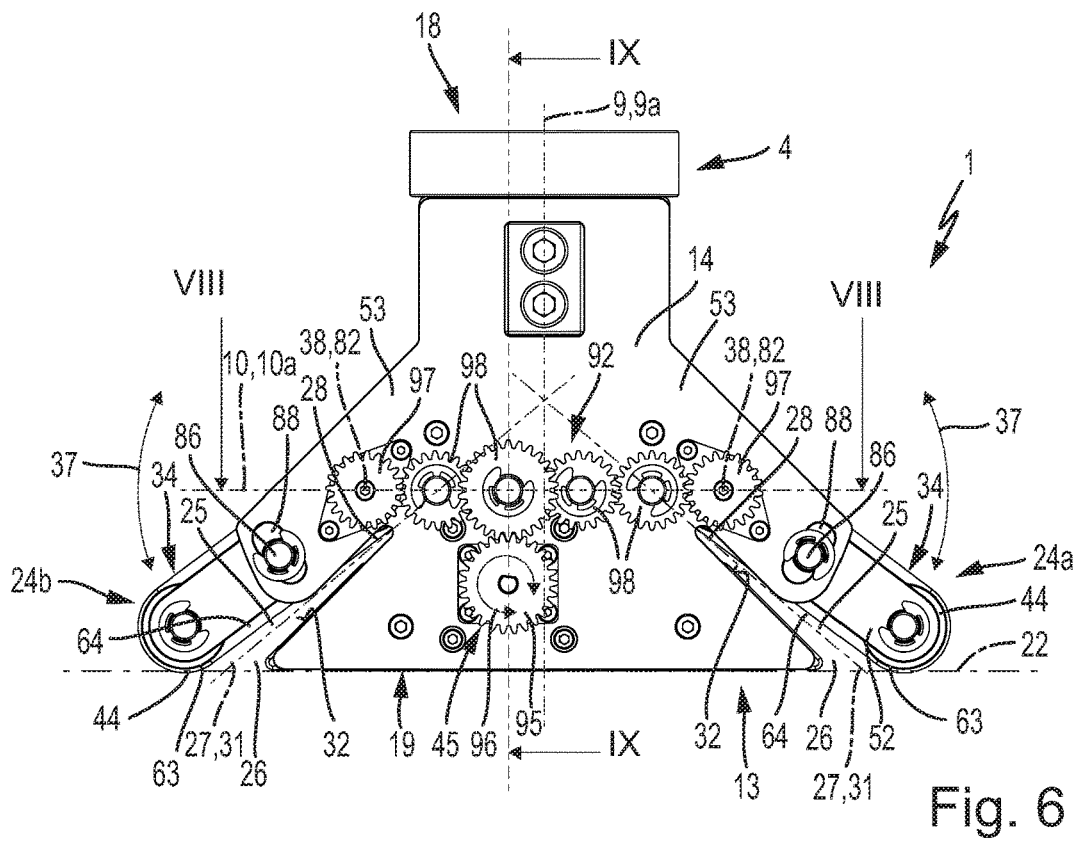

The gripping device 4 also has a longitudinal axis 8 at right angles to the vertical axis 9, which longitudinal axis extends between a front side 15 and a rear side 16 of the gripping device 4, wherein FIG. 5 provides a view of the front side and FIG. 6 a view of the rear side 16 of the gripping device 4.

A notional lateral axis 10 of the gripping device 4 runs orthogonally to both the longitudinal axis 8 and also the vertical axis 9 and extends between two opposing lateral device regions 7a, 7b.

The gripping device 4 has a stable and in particular rigid support structure 14. The optional attachment interface 6 is designed on the support structure 14 and there in particular on the top side 18.

The support structure 14 has, on the bottom side 13, a bearing surface 19 pointing downwards, in height direction 9a. By way of example, it is contoured at right angles, and extends in a bearing plane 22 at right angles to the vertical axis 9. With its intended use, the gripping device 4 can be placed from above on a flexible flat object 2 to be repositioned, with the bearing surface 19 according to arrow 23 in FIG. 10. The flat object 2 impinged on by the bearing surface 22, is supported on the one hand in vertical direction on the supply device 3, with the result that it is frictionally held, and in particular clamped, between the bearing surface 22 and the supply device 2.

The gripping device 4 is equipped with two gripping units 24a, 24b which below are also called first and second gripping units 24a, 24b and which are each located on one of the two lateral device regions 7a, 7b. The two gripping units 24a, 24b are arranged at the same height in height direction 9a and at a mutual distance from one another in axial direction of the lateral axis 10. Preferably, they are designed to be at least substantially mirror-symmetrical to a plane of symmetry covered by the vertical axis 9 and the longitudinal axis 8.

Each of the two gripping units 24a, 24b defines a clamping gap 25 which has a gap opening 26 facing the bottom side 13, which gap is also called object introduction opening 25. The two object introduction openings 26 are each attached in the axial direction of the lateral axis 10, also called lateral direction 10a below, on one of the two outer end portions 19a, 19b of the bearing surface 19, with which the two lateral device regions 7a, 7b are associated. Each object introduction opening 26 extends preferably at least substantially in the bearing plane 22.

Each object introduction opening 26 has a longitudinal extension parallel to the longitudinal axis 8, which extension is less than a width of the object introduction opening 26 in question, measured in lateral direction 10a.

Each clamping gap 25 extends in the axial direction of the longitudinal axis 8, also called longitudinal direction 8a below, continuously from the front side 15 to the rear side 16, wherein it is open continuously, both on the front side 15 and also on the rear side 16. The same applies to the object introduction opening 26, designed in particular slit-shaped.

Each clamping gap 25 has a gap longitudinal axis 27 which runs in a common plane with the vertical axis 9 and expediently also the lateral axis 10 and which extends starting from the object introduction opening 26 up to an inner gap end 28 which is closer to the top side 18 than the object introduction opening 26. Each clamping gap 25 extends in a gap plane 31 which coincides with the gap longitudinal axis 26, which plane is aligned parallel to the longitudinal axis 8 and which is inclined in respect of the vertical axis 9 such that it gets close to the central vertical axis 9 of the gripping device 4 on its path from object introduction opening 26 to inner gap end 28. In other words, the two object introduction openings 26 are arranged at a greater distance from one another than the two inner gap ends 28, relative to transverse direction 10a. Preferably, each gap plane 31 encloses an acute angle with the bearing plane 22 at the inside facing the vertical axis 9.

Figure 7:
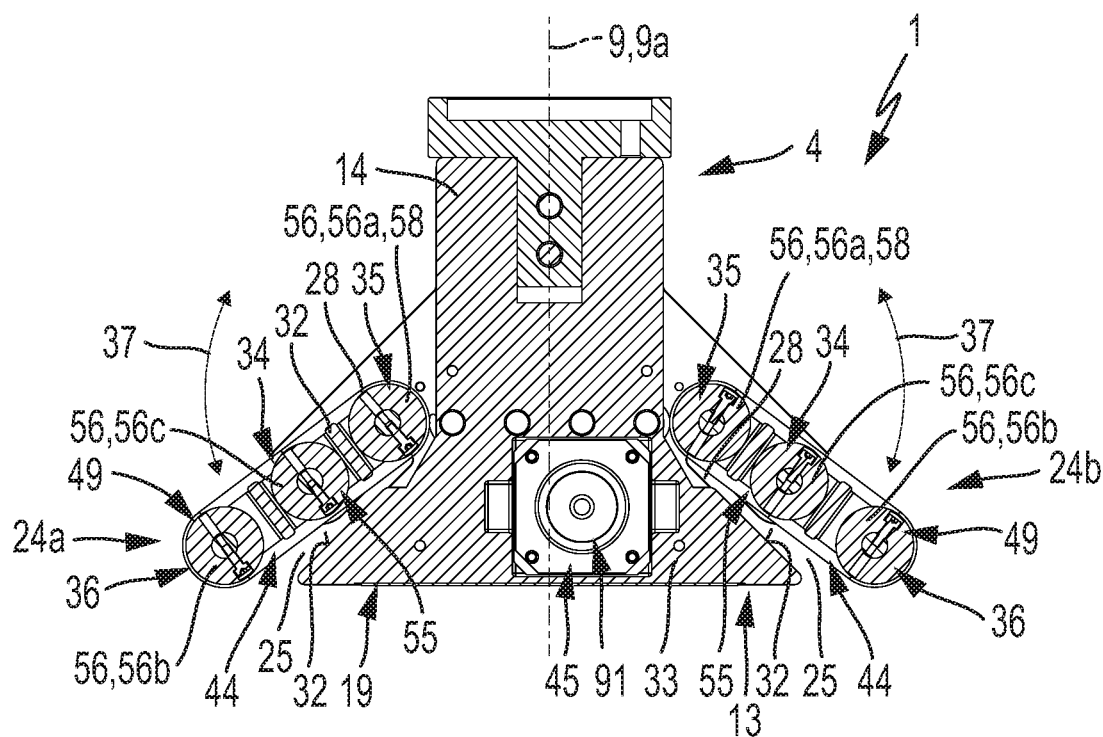
Figure 8:
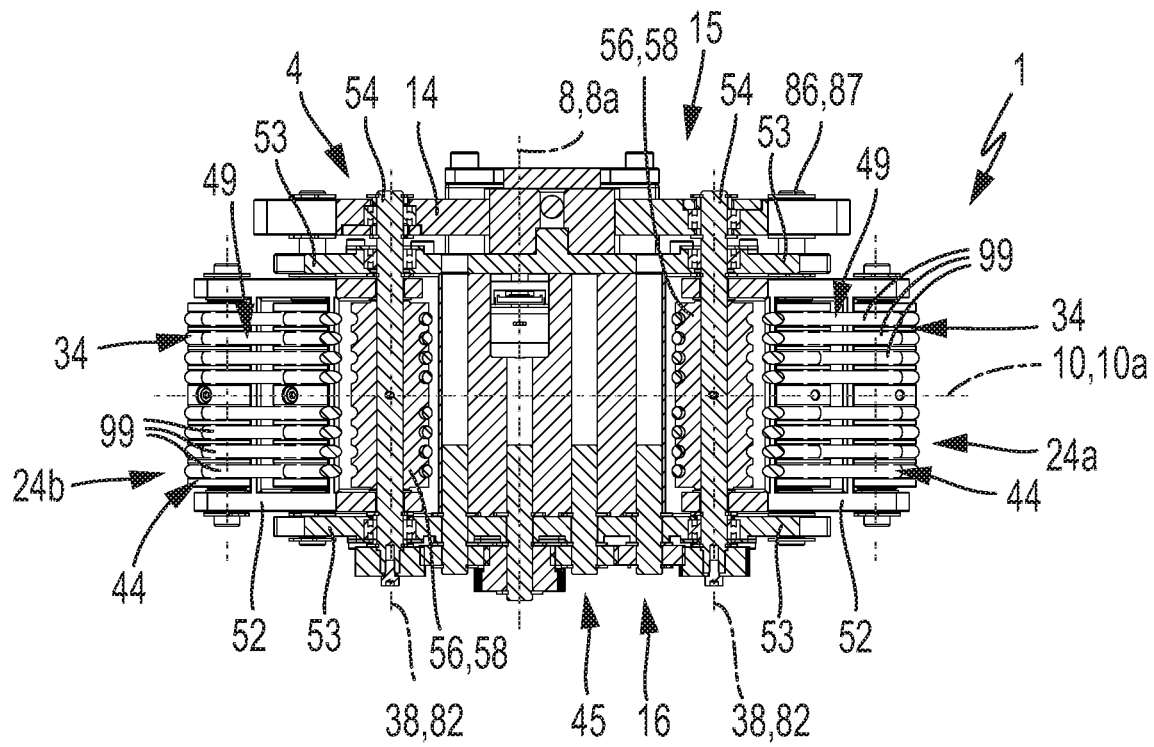
Figure 9:
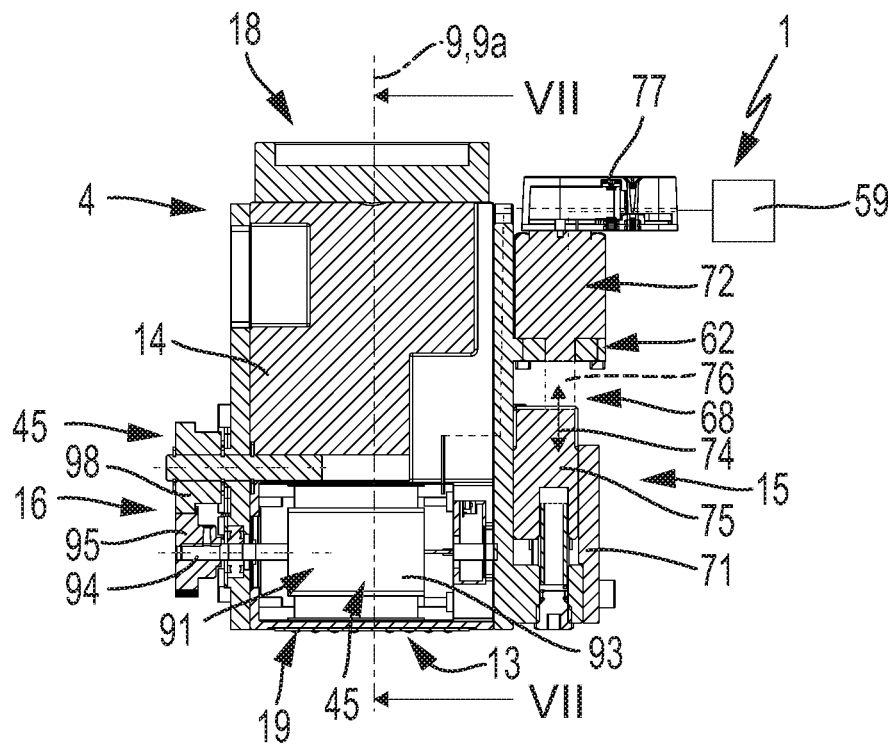

Each clamping gap 25 is delimited on the one hand by a clamping surface 32 arranged or designed on the support structure 14, which surface is formed in particular by a lateral surface portion of the support structure 14 facing the lateral device region 7a, 7b. Expediently, this results in a trapezoidal shape of an end portion 33 of support structure 14 facing the bottom side 13, which design is easily visible from FIGS. 5 to 7. The outer contour of this lower end portion 33 is delimited at the bottom by the bearing surface 19 and at the lateral sides by the clamping surfaces 32, converging from the top at the lateral sides. Each clamping surface 32 is preferably a flat surface.

Each clamping gap 25 is delimited by a clamping arm 34 arranged on the support structure 4 in a region opposite the clamping surface 32, which arm is a component of the associated gripping unit 24a, 24b, alongside the distanced opposite clamping surface 32.

Each clamping arm 24 has an inner end portion 35 which is fastened in a region of the support structure 14 lying above the inner gap end 28 in height direction 9a and which, proceeding from there, extends downwards in direction of the bottom side 13 with a course which is inclined in respect of the height axis 9 and ends with an outer end portion 36 opposite the inner end portion 35. The inner end portions 35 of the two clamping arms 34 thus lie closer to one another than the two outer end portions 36.

Preferably, each clamping arm 34 is housed swivelable on the support structure 14, making possible a clamping arm swivel movement 37 illustrated by double arrows. The swivel axis 38 for the clamping arm swivel movement 37 runs in longitudinal direction 8a of the gripping device 4. The swivel axis 38 is preferably located in the region of the inner end portion 35 of the clamping arm 35. A gap height of the clamping gap 35, measured between the clamping surface 32 and the clamping arm 34, changes during clamping arm swivel movement 37.

Figure 10:
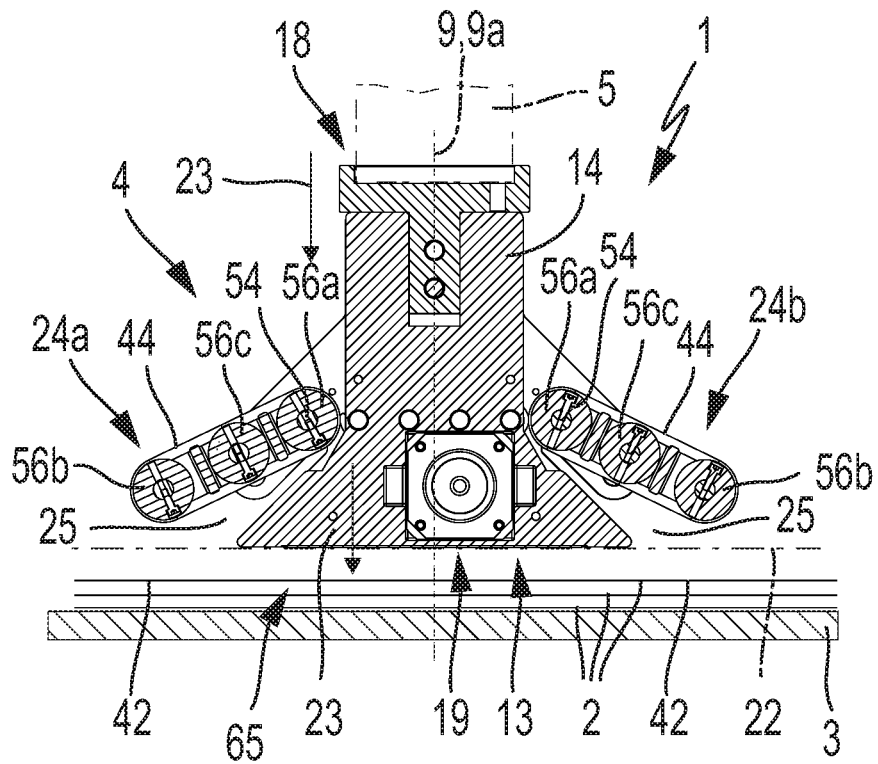
Figure 13:
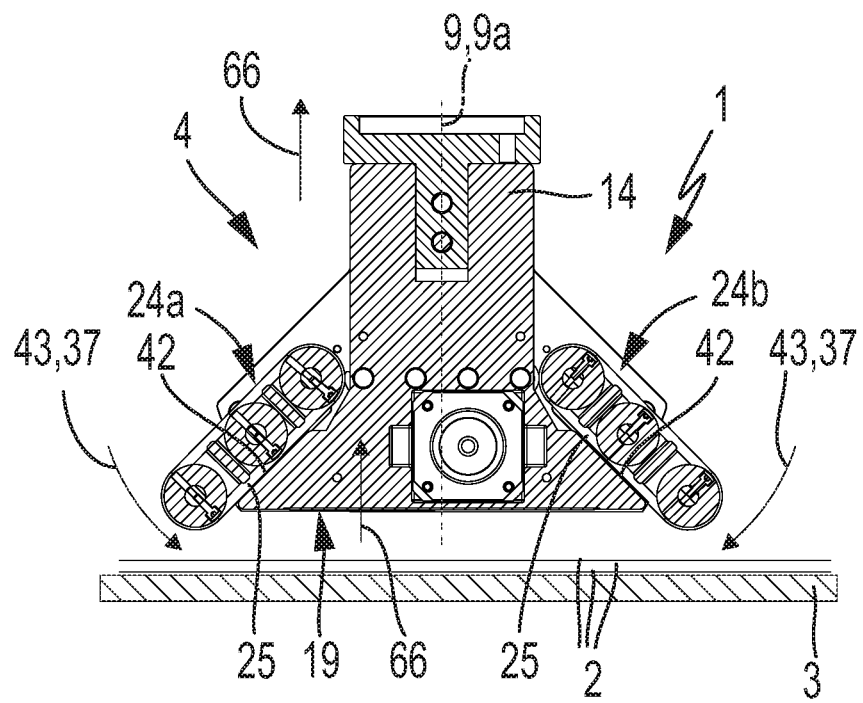

Preferably, each clamping arm 34 can be swivelled between an inner swivel end position swivelled onto the associated clamping surface 32, which end position can be seen in FIG. 13, and in which the gap height of the clamping gap 25 is preferably at least approximately zero, and a swivelled-out outer swivel end position, relative to the support structure 14, visible from FIG. 10. In the outer swivel end position, the gap height of the clamping gap 25 has a maximum. At least in all swivel positions of the clamping arm 34 deviating from the inner swivel end position, the clamping gap 25 expediently has a course which tapers proceeding from the object introduction opening 26 to the inner gap end 28.

By means of the gripping device 4, a pliable flat object 2 can be held and transported by one of two portions 42 of the flat object 2, also called flat object portion 42 below, being clamped temporarily in each of the two clamping gaps 25. Each gripping unit 24a, 24b of the clamping mechanism used for this comprises the clamping surface 32 arranged fixedly on the support structure 14 and clamping arm 34, which can be swivellably moved in respect of same. The result of clamping and consequently holding a flat object portion 42 is that, proceeding from a swivel position different from the inner swivel end position and also called swivel open position, the clamping arm 34 is swivelled according to arrows 43 in direction of the inner swivel end position until the desired clamping force is exerted on the flat object portion 42 located in clamping gap 25. The outer swivel end position, mentioned further above, represents a swivel open position with clamping gap 25 extended to its maximum.

A particular embodiment of each clamping arm 34 makes it possible for the flat object portion 42 to be held of flat object 2 to be repositioned to be transported through the object introduction opening 26 into the clamping gap 25. This particular design of the clamping arm 34 contains a transport structure 44 which, in the gripping position of the gripping device 4 visible in FIGS. 5, 10 to 12 and 14 according to arrows 47 in FIG. 11, can be pressed onto the flat object portion 42 of flat object 2 projecting beyond the bearing surface 19, and can be driven in this pressed-in state by a rotary drive device 45 of the gripping device 4 to a circular transport movement 46 illustrated by arrows in FIGS. 12 and 14, through which the impinged flat object portion 42 is entrained frictionally and transported through the object introduction opening 26 according to arrows 48 in FIGS. 12 and 14 into the associated clamping gap 25. As the transport movement 46 is a circular movement, it can also be said that the flat object portion 42 to be held is thereby rolled into the adjacent clamping gap 25.

According to the preferred illustrated embodiment example, the transport structure 44 is a component of a transport device 49 of the clamping arm 34 in question, which is arranged movable on an arm base 52 of the clamping arm 34, housed swivellable to achieve the swivel mobility of the clamping arm 34 on the support structure 14. The above statements in respect of the swivel positioning of the clamping arms 34 thus relate by way of example to the respective arm base 42.

By way of example, the support structure 14 has two side frames 53 projecting in lateral direction 10a and spaced apart from one another in longitudinal direction 8a on the two lateral device regions 7a, 7b, between which frames the associated clamping arm 34 with its inner end portion 35 is immersed and between which a bearing shaft 54 extends, which shaft also penetrates the inner end portion of the arm base 52 in such a manner that the same can be swivelled about the bearing shaft 54, the longitudinal axis of which, by way of example, defines the swivel axis 38 for the clamping arm swivel movement 37. Each clamping arm 34 is thus housed swivellable on the support structure 14 to make possible the clamping arm swivel movement 37 over the associated arm base 52.

The transport device 49 has a transport roller arrangement 55 with a plurality, and as example three, transport rollers 56, each of which is housed rotatable at the arm base 52 about its longitudinal axis 57, wherein its longitudinal axes 57 extend parallel to the longitudinal axis 8 of the gripping device 4. The plurality of transport rollers 56 are arranged in the axial direction of the gap longitudinal axis 27 in succession, at a distance from one another. The transport structure 44 is wound only externally around the transport roller arrangement 55, wherein an inner transport roller 56a associated with the inner end portion 35 functions as a deflection roller, just like an outer transport roller 56b associated with the outer end portion 36, while the central transport roller 56b, arranged therebetween, performs merely the function of a backup roller.

In a non-illustrated embodiment example, the central transport roller 56c is dispensed with, while in a likewise non-illustrated other embodiment example a plurality of central transport rollers 56c are arranged as backup rollers between the inner and outer transport roller 56a, 56b.

One of the transport rollers 56 per clamping arm 34, which as an example is the inner transport roller 56, functions as a drive roller 58, which is coupled to the rotary drive device 45 and which can be driven rotationally by the rotary drive device 45, in order to generate the transport movement 56 of the transport structure 44 circulating about the transport roller arrangement 55. By way of example, there is a frictional transmission of a driving force between the drive roller 58 and the transport structure 44 due to a certain pretensioning with which the transport structure 44 sits on the transport roller arrangement 55. In particular in this connection, it is advantageous if the transport structure 44 which relates to the embodiment example is made of a material with rubbery-elastic properties, and in particular is made of an elastomer material. Alternatively, the transport structure 44 could be designed for example also in the manner of a toothed belt, and engage with an outer toothed drive roller 58.

The manipulating device 1 is expediently equipped with an electronic control device 59 to which the rotary drive device 45 is connected, in order to induce the transport movement 46 itself, or if necessary, the stopping of the transport movement 46. The transport movement 46 can be induced preferably bidirectionally.

The gripping device 4 is expediently equipped with a swivel drive device 62 by which the clamping arm swivel movement 37 can be induced, and by which each clamping arm 34 can expediently be positioned in the different swivel positions already mentioned further above. The swivel drive device 62 is also expediently connected to the electronic control device 59, by which the clamping arm swivel movement 37 and the positioning of the clamping arms 34 can be controlled, according to the swivel angle.

The transport structure 44 of each clamping arm 34 has a portion pointing downwards in height direction 9a, in the region of the outer end portion 36, which portion is called transport initialisation portion 63 below, and which is in particular that portion of the transport structure 44 which defines the lowest position, in terms of height, of the transport structure 44, regardless of the swivel position of the clamping arm 34. This is that distance from the transport structure 44 which, with the downward swivelling of the clamping arms 34, initiates the first contact between the transport structure 44 and the associated flat object portion 42, taking place according to arrows 47. By way of example, the transport initialisation portion 63 is formed by that longitudinal portion of the transport structure 44 currently wound around the outer transport roller 56b of the object introduction opening 26 and which, to make it more easily distinguishable, is also called winding portion.

Preferably, the transport initialisation portion 63 is formed by that end region of the winding portion of the transport structure 44 which currently passes over into the branch of the transport structure 44, also called transport branch 64, which delimits the clamping gap 25.

Due to the contact of the transport initialisation portion 63 with the flat object 2, the process, illustrated by arrows 48, of transporting, or rolling, the flat object portion 42 into the associated clamping gap 25, begins.

In a preferred method for operating the manipulating device 1, initially a plurality of layers of flat objects 2 are laid on a supply device 3 by forming a flat object stack 65, as illustrated in FIG. 10. Then, according to arrows 23, the gripping device is lowered initially with its bearing surface 19 onto the flat object stack 65 until the bearing surface 19 sits upon the top flat object 2 of the flat object stack 65. In so doing, the two clamping arms 34 are in the outer swivel end position.

Figure 11:
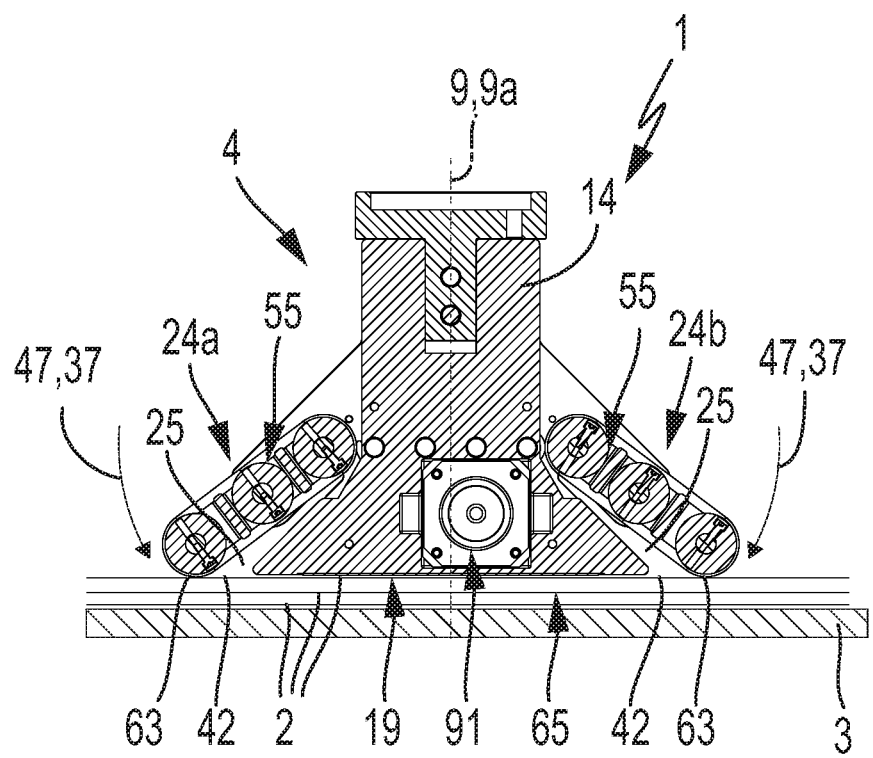

Subsequent to this, corresponding to the illustration in FIG. 11, the two clamping arms 34 are driven, by the swivel drive device 62, to a clamping arm swivel movement 37, by which they are lowered according to arrows 47 until the transport structure 44 is pressed onto the flat object portion 42 projecting over the bearing surface 19 with the transport initialisation portion 63.

Subsequently, the transport structures 44 of the two clamping arms 34 are driven to the transport movement 46 by the rotary drive device 45, in which movement they circulate around the respective transport roller arrangement 56. In this operating phase illustrated in FIG. 12, the flat object portions 42 of the transport structure 44 in contact in the region of the transport initialisation portion 63 are entrained frictionally and moved into the associated clamping gap 25 within the scope of a folding process, as illustrated by arrows 48. In this operating phase, the gap height of the clamping gap 25 is usually even greater than the thickness of the flat object portion 42, nevertheless, there is contact with the unstable object material and the transport branch 63, with the result that the flat object portion 42 is reliably conveyed, sufficiently far into the clamping gap 25.

Expediently, a constant drive force, acting in the direction of the inner swivel end position, is exerted on the clamping arms 34 by the swivel drive device 62. The consequence of this is that the gap height of the clamping gaps 25 is reduced at the moment in which the flat object portion 42 has left the region of influence of the transport initialisation portion 63. The clamping arms 34 are then swivelled further downwards until they rest on the flat object portions 42 of the flat object 2 of the flat object stack 65 below, with their transport initialisation portion 63.

If only one single flat object 2 is intended to be received, the transport movement 46 is stopped by the control device 59, once the flat object portion 42 has been rolled into the associated clamping gap 25. Subsequently, the gripping device 4 is then raised from the remaining flat objects 8 of the flat object stack 65 according to arrows 66 in FIG. 13, wherein simultaneously the clamping arms 34 are swivelled in direction of the inner swivel end position according to arrows 43 until the flat object portions 42 located in the clamping gaps 25 are clamped.

Now, the gripping device 4 can be shifted to the desired target location together with the flat object 2 held by same.

The flat object 2 held thus far is released from clamping at the target location, with the result that it falls downwards out of the gripping device 4. For this, the clamping arms 34 are swivelled in direction of the outer swivel end position by correspondingly controlling the swivel drive device 62, whereby the clamping gaps 25 are extended. Laying down the flat object 2 can be supported, if necessary, in that the transport structures 44 are driven to a transport movement 46 by the rotary drive device 45, which movement is directed in opposite direction to that caused by conveying the flat object portions 42 into the clamping gaps 25.

Laying the flat object 2 down at the target location can also be induced by the reversing transport movement 46 along, and without accompanying expansion of the clamping gaps 25.

Figure 12:
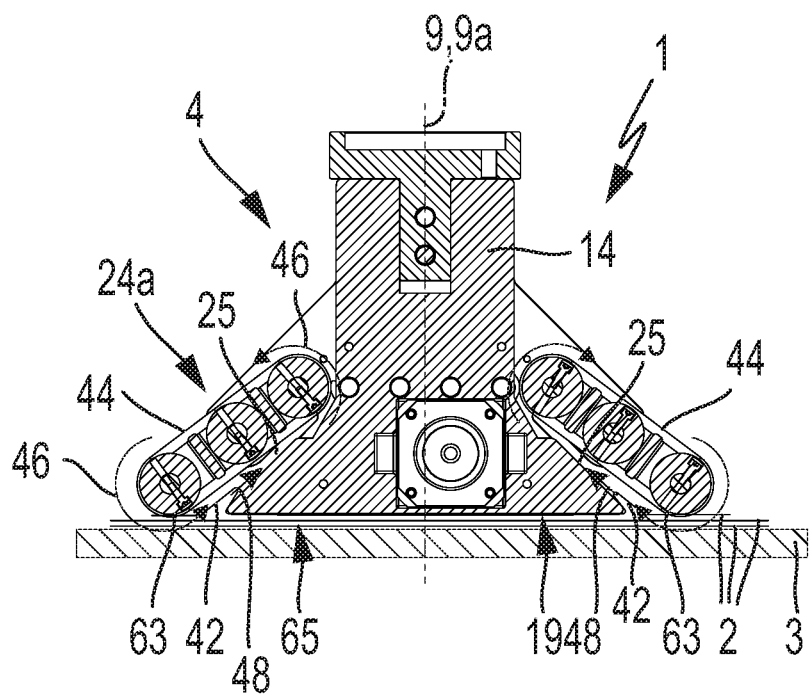

The circular movement 46 according to FIG. 12 causing the flat object portions 42 to be conveyed into the clamping gaps 25 can be started once the transport structure 44 has been pressed onto the flat object portion 42 or even already beforehand, with the result that a transport force is applied to the flat object portion 42 already at the moment of laying it down.

Figure 14:
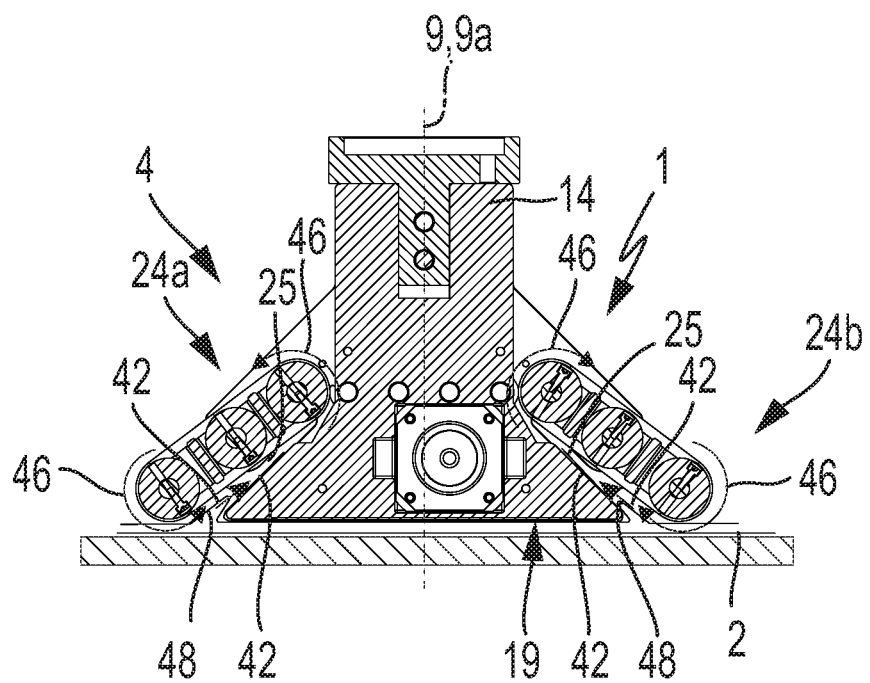

If a plurality of flat objects 2 of the flat object stack 65 are intended to be repositioned together simultaneously by the gripping device 4, the operating phase illustrated in FIG. 12 is repeated until the flat object portions 42 of the desired number of flat objects 2 have been rolled into the clamping gaps 25 one after another. This process sequence is illustrated in FIG. 14. FIG. 14 shows how the flat object portions 42 of the topmost flat object 2 have already been moved fully into the clamping gaps 25 and how flat object portions 42 of the flat object 2 lying below are also being rolled into the clamping gaps 25 at that moment.

Once the flat object portions 42 of all flat objects to be repositioned 2 are moved jointly into the clamping gaps 25, the process following the one illustrated in FIG. 13 concludes, in which now all flat object portions 42 located in the respective clamping gap 25 are together jointly, with the result that a plurality of flat objects 2 are held for repositioning at a target location on the gripping device 4.

As becomes clear in particular from FIG. 13, expediently within the framework of the clamping arm swivel movement 37, each clamping arm 34 can also be swivelled so far downwards that the outer end portion 36, including the transport initialisation section 63 located there, adopts a position which lies lower, in height direction 9a, than the bearing surface 19 or its bearing plane 22. In this way, the clamping arm 34 can be swivelled very close to the associated clamping surface 32, in particular even as far as coming into contact with this clamping surface 32, guaranteeing a secure clamping function even with very thin flat objects 2. Moreover, this guarantees the stack processing of flat objects 2 stacked one on top of another, explained using FIG. 14.

The same sequence of processes can be carried out with a gripping device 4 which has only one single gripping unit 24a or 24b. In comparison with the previously described double action gripping device 4, it can be imagined to form such a simply acting gripping device 4 in that, relative to FIG. 5, the component of the gripping device 4 located to the left of the dotted line 67, including all movable components of the first gripping unit 24a shown there, are dispensed with.

The illustrated manipulating device 1 is equipped with a preferred design of a swivel drive device 62. This swivel drive device 62 contains a linear drive unit 68, arranged on the support structure 14, and a toothed gearing mechanism 69, by which the linear drive unit 68 is coupled to the clamping arm 34 of each gripping unit 24a, 24b to generate the clamping arm swivel movement 37 in force-transmitting manner. Expediently, all components of the swivel drive device 62 are arranged on the front side 15 of the gripping device 4.

The linear drive unit 68 has, by way of example, a drive motor which has a motor casing 73 via which it is fastened at the front to the support structure 14, in particular in a region which is higher, in height direction 9a, than the two clamping arms 34. The linear drive unit 68 also has a servo 75 which can be driven by the drive motor 72 to a linear drive movement 74, illustrated by a double arrow, which servo is preferably displaceably guided, linearly, to a linear guide device 76 attached to the front of the support structure 14.

The linear drive unit 68 is designed such that the movement direction of the linear drive movement 74 coincides with the height direction 9a. The servo 75 is located expediently in the height direction 9a below the drive motor 72 to which it is motion coupled via a drive element 76. By way of example, the drive element 76 is a rotationally drivable motor shaft which has a thread portion in thread engagement with the servo 75, with the result that the consequence of a rotation of the drive element 76 which can be induced by rotation of the drive motor 72 is the linear drive movement 74 of the servo 75 which is rotationally secured in respect of the support structure 14. In this case, the drive motor 72 is in particular an electric motor, and preferably a servomotor which, if necessary, makes possible an exact adjustment of the rotational position of the drive element 76, and thus the linear position of the servo 75.

Alternatively, the drive motor 72 can also be a fluid motor, for example a pneumatic linear drive, in which case the drive element 76 is a linearly displaceable piston rod which engages with the servo 75.

The drive motor 72 can be or is connected to the electronic control device 59, for electric control, via an electromechanical interface device 77, arranged preferably on the motor casing 73 of the drive motor 72.

For each gripping unit 24a, 24b, the servo 75 has a gearbox 78a, 78b, extending in height direction 9a, which gearbox is part of toothed gearing mechanism 69. These two gearboxes 78a, 78b are preferably arranged on longitudinal sides of the servo 75 opposite one another in lateral direction 10a.

Each gripping unit 24a, 24b has a swivel lever 81 which is housed swivellable about a swivel axis 82 on the support structure 14 in respect of same, which axis preferably coincides with the swivel axis 38 of the associated clamping arm 34. By way of example, this is realised in that the bearing shaft 54 penetrates the associated side frame 53 and projects in respect of same on the rear side 15 with a shaft end portion on which the swivel lever 81 is placed, swivellably movable.

Each swivel lever 81 has a drive lever arm 83 on which a convex output spline 84a, 84b facing the servo 75 is designed, which gearbox is in constant toothed engagement with the facing toothed rack-type gearbox 87a, 87b of the servo 75.

When the servo 75 moves up or down in the height direction 9a, the gearboxes 87a, 87b entrain the linear movement, wherein the respectively associated output spline 84a, 84b then rolls off, with the result that the swivel lever 81 is swivelled about the swivel axis 82.

Each swivel lever 81 has, in addition to the drive lever arm 83, an output lever arm 85 which is connected to the arm base 52 of the associated clamping arm 34, radially separate in respect of the swivel axis 38, such that the arm base 52 and thus the whole clamping arm 34 entrains the swivel movement of the swivel lever 81, and thus itself carries out a swivel movement which is the clamping arm swivel movement 37 already mentioned further above. Preferably, this entraining connection is realised in that the clamping arm 34 has an entraining extension 86 projecting in longitudinal direction 8a, which extension is fixed remote from the swivel axis 82 on the output lever arm 85, and for example is inserted into the output lever arm 85.

In the illustrated embodiment example, the entraining extension 86 is formed by the end portion of a bearing shaft 87 of the clamping arm 34, which shaft is used for pivoting the central transport roller 56c. Expediently, this bearing shaft 87 penetrates both associated side frames 53 through a curved long hole 88 designed in the respective side frame 53.

The rotary drive device 45, responsible for generating the transport movement 46 of the transport structure 44, circulating about the transport roller arrangement 56, contains as drive source a rotary drive unit 91, fixed to the support structure 14 and preferably arranged inside the support structure 14. Furthermore, the rotary drive device 45 expediently contains a gearing mechanism 92 by which the rotary drive unit 91 is coupled to the transport structure 44 of each available clamping arm 34. The gearing mechanism 92 is arranged, by way of example, outside the support structure 44, and located in particular on its rear side 16.

Preferably, the rotary drive unit 91 contains an electric motor 93 with a drive shaft which can be driven to a rotational drive movement 96, which shaft projects over the support structure 14 on the rear side 16 and there supports a driving toothed wheel 95 of the gearing mechanism 92, designed as an example as a toothed wheel gearing mechanism. Together with the drive shaft 94, the driving toothed wheel 95 carries out the rotational drive movement 96, illustrated by a double arrow, in the desired direction of rotation.

With each clamping arm 34, the drive roller 58, formed preferably by the inner transport roller 56, is connected, rotationally-resistant, to the bearing shaft 54 penetrating same, wherein an output drive gear 97 of the gearing mechanism 92 is arranged, rotationally-resistant, on an end portion of the bearing shaft 54, penetrating beyond the side frame 53 on the front side 15. The two output drive gears 97 are connected to the driving toothed wheel 95 like a gearing mechanism such that, upon rotation of the driving toothed wheel 95, both output drive gears 97 are rotated simultaneously, and in such a way that the portions of both transport structures 44 facing a clamping gap 34, as an example thus the two transport branches 64, are moved unidirectionally, thus each depending on the rotational direction of the driving toothed wheel 95, either in direction of the inner gap end 28 or in direction of the object introduction opening 26. In this way, a synchronous operation of the two gripping units 24*a*, 24*b*, having the equivalent effect, is possible in which the two gripping units 24*a*, 24*b* are effective simultaneously, either within the meaning of an engagement or within the meaning of releasing a flat object portion 42.

To realise this functionality, the gearing mechanism 92 preferably contains a plurality of reduction gears 98, which are employed between the driving toothed wheel 95 and respectively one of the two output drive gears 97, in the manner easily visible in FIG. 6. These reduction gears 98 also guarantee, simply, that during the clamping arm swivel movement 37, and in each swivel position of the clamping arms 34, there is an uninterrupted rotary drive connection between the driving toothed wheel 95 and the two output drive gears 97.

Expediently, the drive motor 91 of the rotary drive unit 91 can be or is also connected, for its electric connection, to the electronic control device 59 via the aforementioned electromechanical interface device 77.

It is advantageous if the transport structure 44 is made, corresponding to the illustrated embodiment example, from a plurality of respectively annularly self-contained flexurally flexible line elements 99 which are arranged transverse to an arm longitudinal axis 101 of the respective clamping arm, at mutual distance from one another. The arm longitudinal axis 101 runs between the inner and outer end portion 35, 36 of the clamping arm 34 in a plane covered by the vertical axis 9 and the lateral axis 10. Each line element 99 encloses the associated transport roller arrangement 55. Preferably, the line elements 99 are not only flexurally flexible, but also rubber-elastic, wherein they sit on the transport roller arrangement 55 under pretension.

As an example, the line body of each line element 99 has a circular cross-section, in particular comparable with a so-called O-ring. Each transport roller 56 has, on its outer circumference, a number of annular grooves corresponding expediently to the number of line elements 99, which grooves are arranged successively in the longitudinal direction of the respective transport roller 56, and which respectively partially receive one of the line elements 99, with the result that it is guided precisely during the circular transport movement 46.

In a non-illustrated embodiment, the plurality of line elements 99 are designed ribbon-shaped, with in particular a line body which is rectangular in cross-section.

In a likewise non-illustrated embodiment example, the transport structure 44 is made of a single annularly self-contained line element 99 which is designed ribbon-shaped, with the result that the transport structure 44 can be called a single conveyor belt.

The invention claimed is:

1. A manipulating device for repositioning flexible flat objects, with at least one gripping device which is movable in space and has a notional central vertical axis, which gripping device has at least one gripping unit permitting releasable gripping and holding of flat objects,
wherein:
that the gripping device has a support structure which is provided with a bearing surface pointing downwards in the axial direction of the vertical axis on an underside of the gripping device, and with which support structure the gripping device can be placed on a flat object to be gripped, to adopt a gripping position,
and that the at least one gripping unit has a clamping gap extending between a clamping surface of the support structure and a clamping arm arranged on the support structure, which gap is open with an object introduction opening towards the underside of the gripping device, and in which a flat object portion of the flat object to be repositioned can be firmly clamped, releasably,
wherein the clamping arm has a transport structure which can be pressed on the flat object to be gripped in the gripping position of the gripping device, and can be driven by a rotary drive device to a circular transport movement, by means of which a flat object portion impinged on by same can be transported, frictionally, through the object introduction opening, into the clamping gap,
wherein the clamping arm of the at least one gripping unit is arranged to be movable, in swivelling manner, on the support structure and, in respect of the support structure, can carry out a clamping arm swivel movement in which the height position of a transport initialisation portion of the transport structure, to be pressed onto a flat object to be gripped, and simultaneously a gap height of the clamping gap, measured between the clamping surface and the clamping arm, is changed, and
wherein the gripping device has a swivel drive device to induce the clamping arm swivel movement and has different swivel positions for positioning the clamping arm in respect of the support structure.

2. The manipulating device according to claim 1, wherein the transport structure is made of a material with rubbery-elastic properties, and expediently of an elastomer material.

3. The manipulating device according to claim 1, wherein the bearing surface extends in a bearing plane at right angles to the vertical axis of the gripping device.

4. The manipulating device according to claim 1, wherein the clamping gap extends in a gap plane which is inclined in respect of the vertical axis such that a transverse distance, measured in axial direction of a lateral axis perpendicular to the vertical axis, between the clamping gap and the vertical axis increases towards the underside of the gripping device.

5. The manipulating device according to claim 4, wherein the bearing surface extends in a bearing plane at right angles to the vertical axis of the gripping device, wherein the bearing plane and the gap plane enclose an acute angle.

6. The manipulating device according to claim 1, wherein the swivel drive device has a linear drive unit designed expediently as a motor, arranged on the support structure, which unit is coupled to the clamping arm via a toothed gearing mechanism.

7. The manipulating device according to claim 6, wherein the linear drive unit has a servo which can be driven to a linear drive movement in the axial direction of the vertical axis, which servo has a gearbox of the toothed gear in the manner of a toothed rack, which gearbox is in toothed engagement with a curved output spline of the toothed gear arranged on the clamping arm, with the result that a clamping arm swivel movement of the clamping arm clockwise or counter-clockwise can be induced, depending on the movement direction of the linear drive movement of the servo.

8. The manipulating device claim 1, wherein the processes for clamping and releasing the flat object portion in the clamping gap can be induced by the clamping arm swivel movement of the clamping arm and the resulting change in gap height of the clamping gap.

9. The manipulating device according to claim 1, wherein the transport structure is part of a transport device of the clamping arm which is arranged movable in respect of same on an arm base of the clamping arm connected to the support structure.

10. The manipulating device according to claim 9, wherein the transport device has a transport roller arrangement having at least one rotatable transport roller, about which the transport structure extends annularly in self-contained manner, wherein at least one transport roller can be rotationally driven to create the circular transport movement of the transport structure.

11. The manipulating device according to claim 10, wherein the rotary drive device provided to generate the transport movement of the transport structure has a rotary drive unit arranged on the support structure, expediently designed as a motor, which unit is coupled to the transport structure via a gearing mechanism designed expediently as toothed wheel gearing mechanism, and wherein the rotary drive unit is coupled to the rotationally drivable transport roller of the transport roller arrangement.

12. The manipulating device according to claim 1, wherein the transport structure is part of a transport device of the clamping arm which is arranged movable in respect of same on an arm base of the clamping arm connected to the support structure, and wherein the clamping arm is housed swivellable on the support structure to make possible the clamping arm swivel movement via the arm base.

13. The manipulating device according to claim 1, wherein the clamping gap has a gap longitudinal axis extending in a common plane with the vertical axis and proceeding from the object introduction opening, wherein the transport roller arrangement has a plurality of transport rollers arranged spaced apart from one another in the axial direction of the gap longitudinal axis, each arranged rotatable on the arm base, about which arrangement the transport structure is wound, and wherein that longitudinal portion of the transport structure which currently is wound around a transport roller associated with the object introduction opening, forms the transport initialisation portion of the transport structure which can be pressed onto the flat object to be gripped in the gripping position.

14. The manipulating device according to claim 1, wherein the rotary drive device provided to generate the transport movement of the transport structure has a rotary drive unit arranged on the support structure, expediently designed as a motor, which unit is coupled to the transport structure via a gearing mechanism designed expediently as toothed wheel gearing mechanism.

15. The manipulating device according to claim 1, wherein the transport structure is made of at least one annularly self-contained flexurally flexible line element, wherein it is composed expediently of a plurality of line elements arranged adjacent to one another at mutual distance transverse to an arm longitudinal axis of the clamping arm.

16. The manipulating device according to claim 1, wherein the gripping device has two gripping units arranged adjacent to one another, transverse to the vertical axis, which units can be operated, expediently synchronously, for gripping and holding a flat object.

17. The manipulating device according to claim 1, wherein an attachment interface for fastening the gripping device to a positioning unit also expediently part of the manipulating device is designed on the support structure, by which unit the gripping device can be moved and positioned by carrying out a manipulating movement.

18. The manipulating device according to claim 1, an electronic control device for controlling operation of the at least one gripping device.

19. A manipulating device for repositioning flexible flat objects, with at least one gripping device which is movable in space and has a notional central vertical axis, which gripping device has at least one gripping unit permitting releasable gripping and holding of flat objects,
wherein:
that the gripping device has a support structure which is provided with a bearing surface pointing downwards in the axial direction of the vertical axis on an underside of the gripping device, and with which support structure the gripping device can be placed on a flat object to be gripped, to adopt a gripping position,
and that the at least one gripping unit has a clamping gap extending between a clamping surface of the support structure and a clamping arm arranged on the support structure, which gap is open with an object introduction opening towards the underside of the gripping device, and in which a flat object portion of the flat object to be repositioned can be firmly clamped, releasably,
wherein the clamping arm has a transport structure which can be pressed on the flat object to be gripped in the gripping position of the gripping device, and can be driven by a rotary drive device to a circular transport movement, by means of which a flat object portion impinged on by same can be transported, frictionally, through the object introduction opening, into the clamping gap,
wherein the clamping arm of the at least one gripping unit is arranged to be movable, in swivelling manner, on the support structure and, in respect of the support structure, can carry out a clamping arm swivel movement in which the height position of a transport initialisation portion of the transport structure, to be pressed onto a flat object to be gripped, and simultaneously a gap height of the clamping gap, measured between the clamping surface and the clamping arm, is changed, and wherein the clamping arm can be swivelled so far downwards, by means of the clamping arm swivel movement, that the transport initialisation portion of the transport structure is lower in the axial direction of the vertical axis than the bearing surface of the support structure.

20. A manipulating device for repositioning flexible flat objects, with at least one gripping device which is movable in space and has a notional central vertical axis, which gripping device has at least one gripping unit permitting releasable gripping and holding of flat objects, wherein:

that the gripping device has a support structure which is provided with a bearing surface pointing downwards in the axial direction of the vertical axis on an underside of the gripping device, and with which support structure the gripping device can be placed on a flat object to be gripped, to adopt a gripping position, and that the at least one gripping unit has a clamping gap extending between a clamping surface of the support structure and a clamping arm arranged on the support structure, which gap is open with an object introduction opening towards the underside of the gripping device, and in which a flat object portion of the flat object to be repositioned can be firmly clamped, releasably, wherein the clamping arm has a transport structure which can be pressed on the flat object to be gripped in the gripping position of the gripping device, and can be driven by a rotary drive device to a circular transport movement, by means of which a flat object portion impinged on by same can be transported, frictionally, through the object introduction opening, into the clamping gap, wherein the transport structure is part of a transport device of the clamping arm which is arranged movable in respect of same on an arm base of the clamping arm connected to the support structure, wherein the transport device has a transport roller arrangement having at least one rotatable transport roller, about which the transport structure extends annularly in self-contained manner, wherein at least one transport roller can be rotationally driven to create the circular transport movement of the transport structure, and wherein the clamping gap has a gap longitudinal axis extending in a common plane with the vertical axis and proceeding from the object introduction opening, wherein the transport roller arrangement has a plurality of transport rollers arranged spaced apart from one another in the axial direction of the gap longitudinal axis, each arranged rotatable on the arm base, about which arrangement the transport structure is wound.

21. The manipulating device according to claim 20, wherein the clamping arm of the at least one gripping unit is arranged to be movable, in swivelling manner, on the support structure and, in respect of the support structure, can carry out a clamping arm swivel movement in which the height position of a transport initialisation portion of the transport structure, to be pressed onto a flat object to be gripped, and simultaneously a gap height of the clamping gap, measured between the clamping surface and the clamping arm, is changed.

22. The manipulating device according to claim 21, wherein the gripping device has a swivel drive device to induce the clamping arm swivel movement and has different swivel positions for positioning the clamping arm in respect of the support structure.

23. A method for operating the manipulating device according to claim 1, according to the following method steps:

(a) positioning the gripping device in a gripping position in which the support structure is placed with its bearing surface from vertically above on a flexible flat object to be repositioned, (b) pressing the transport structure of each gripping unit onto the flat object to be gripped while or after positioning the gripping device in the gripping position, (c) carrying out the circular transport movement of the transport structure, and thereby transporting, frictionally, a flat object portion impinged on by the transport structure into the clamping gap, wherein the transport movement is started before or after pressing the transport structure onto the flat object, (d) holding the flat object portion moved into the clamping gap by clamping between the clamping arm and the clamping surface of the support structure, and (e) shifting the gripping device, including the held flat object, to a target location.

24. The method according to claim 23, wherein a plurality of flexible flat objects provided as a flat object stack stacked one on top of another are jointly repositioned, wherein method step (a) is carried out only in respect of the topmost flat object of the flat object stack, and then when maintaining the gripping position abutting against the topmost flat object, by carrying out method steps (b) and (c), likewise mentioned further above, once or repeatedly, a flat object portion of one or more flat objects lying beneath is likewise transported into the clamping gap, with the result that flat object portions of a plurality of flat objects are arranged lying one on top of the other in the clamping gap, at which point, due to method steps (d) and (e), all flat object portions in the clamping gap are jointly clamped and shifted to a target location.

* * * * *